Aug. 11, 1931.  W. J. DRUCKER  1,818,467
CUTTER
Filed Sept. 19, 1927    3 Sheets-Sheet 1
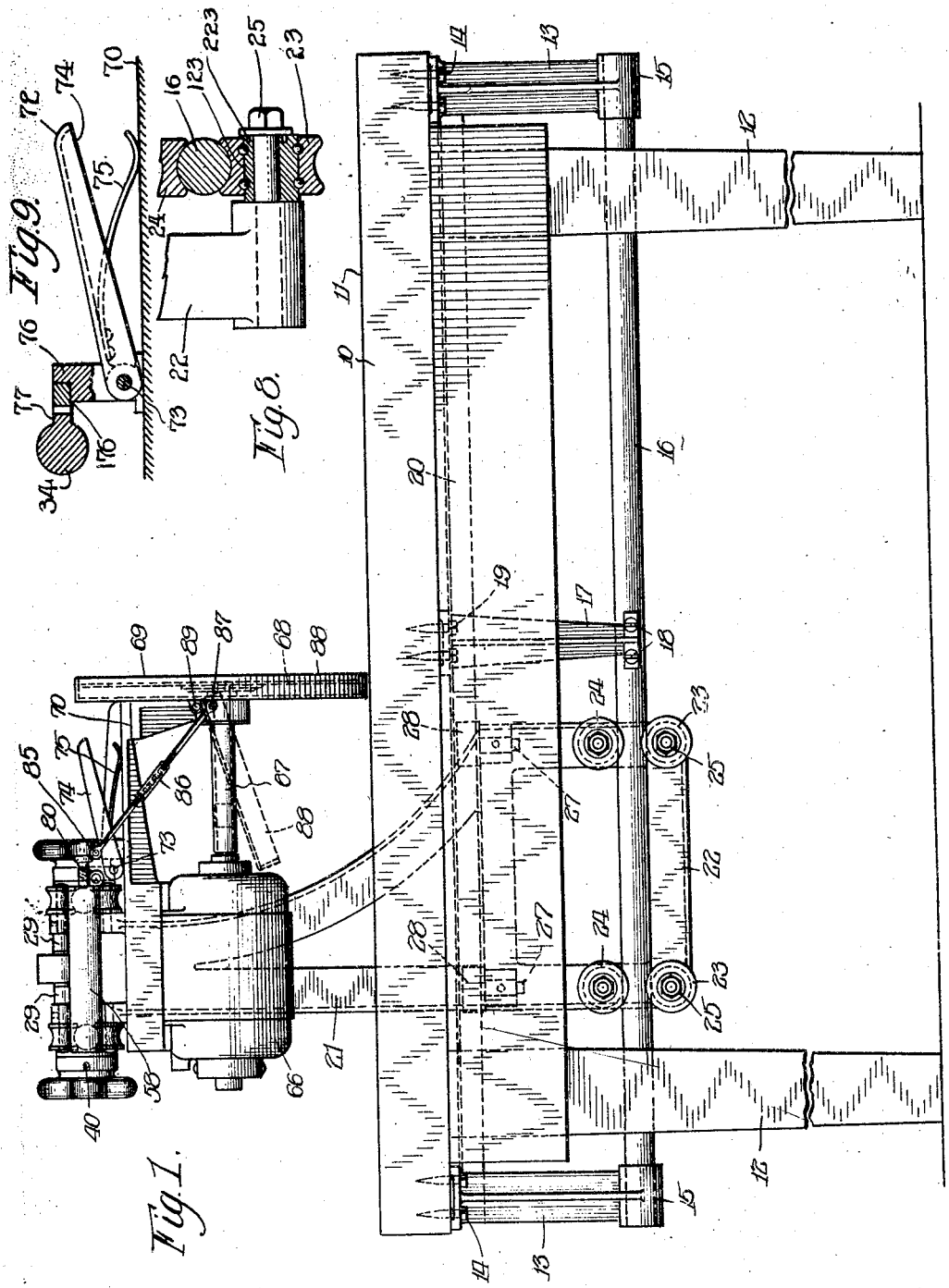
Inventor:
William J. Drucker,
By Wilkinson, Huxley, Byron, Knight
attys.
Witness:
P. Burkhardt.

Aug. 11, 1931.  W. J. DRUCKER  1,818,467
CUTTER
Filed Sept. 19, 1927  3 Sheets-Sheet 2
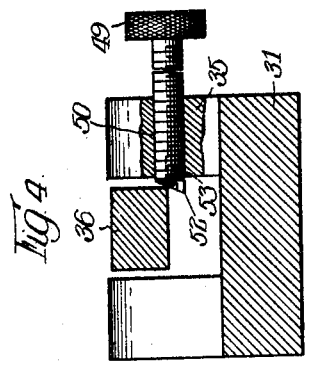
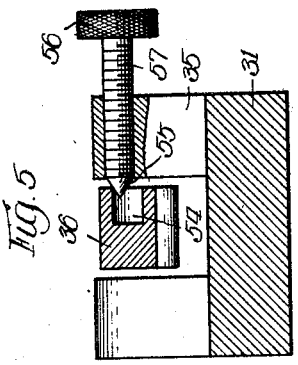
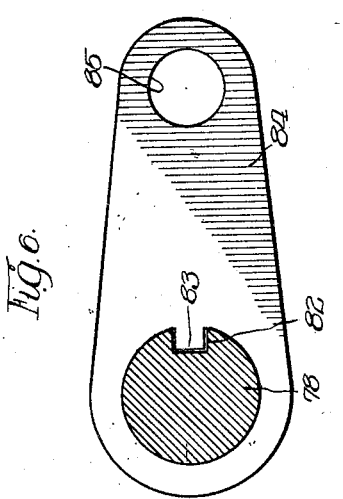
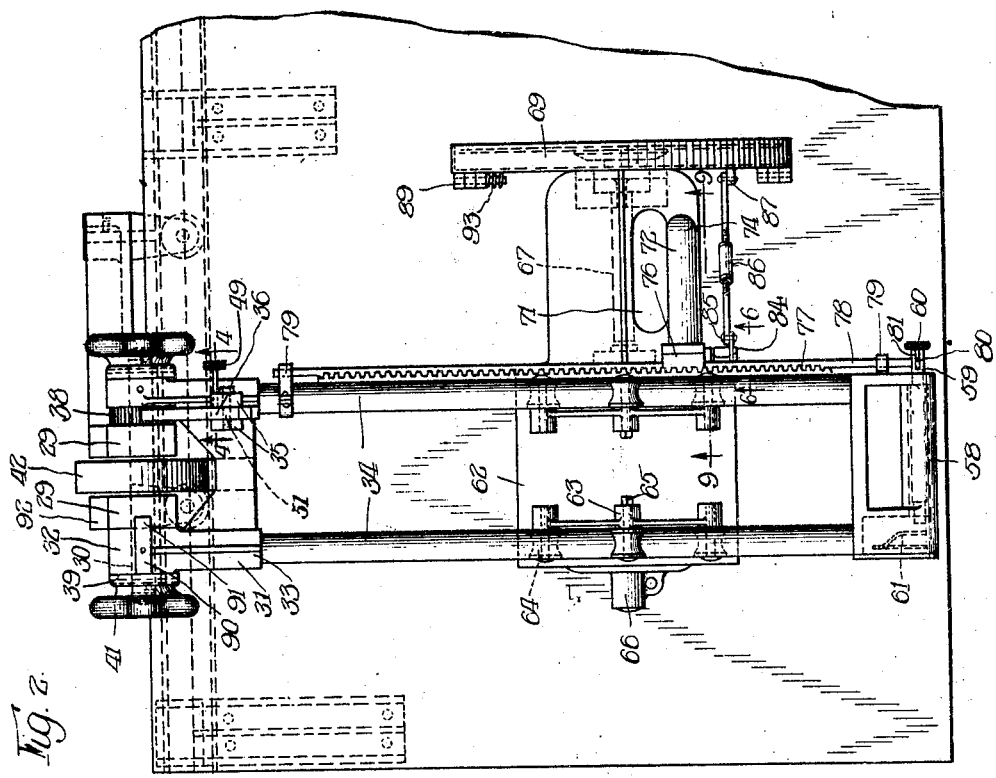
Inventor:
William J. Drucker

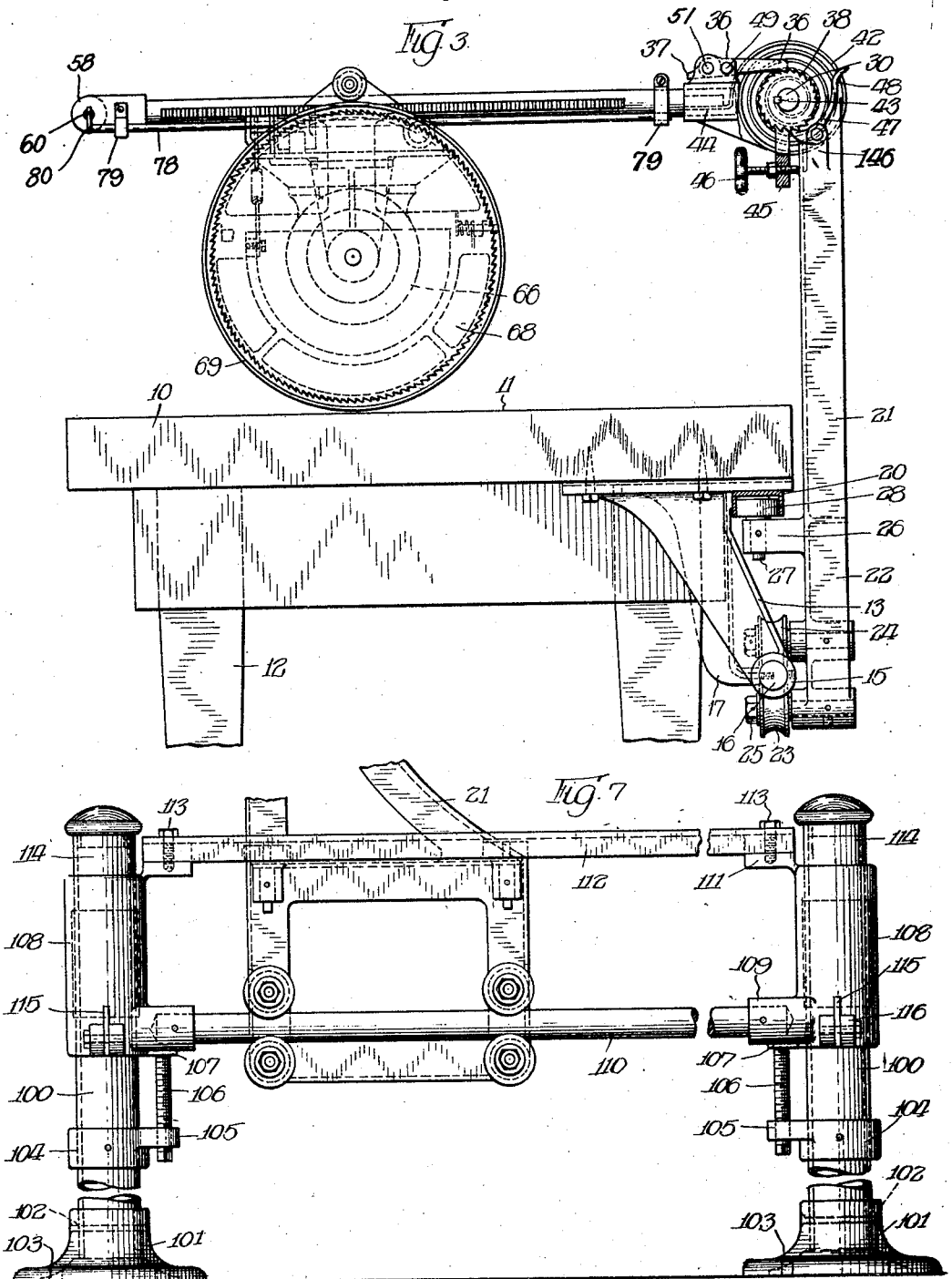

Patented Aug. 11, 1931

1,818,467

UNITED STATES PATENT OFFICE

WILLIAM J. DRUCKER, OF CHICAGO, ILLINOIS

CUTTER

Application filed September 19, 1927. Serial No. 220,330.

This invention pertains to cutters, and more particularly to those forms of cutting assemblies adapted for use in conjunction with meat tables.

In certain businesses, as the butcher or meat business, it is frequently necessary to saw through hard, tough material associated with comparatively thin, tender material, such as sawing through a meat bone found in certain types of meats. Usually this is accomplished by means of the old-fashioned meat handsaw. This, while inexpensive initially, is not entirely satisfactory because, due partially to the slowness with which this saw is operated, such operation smears or spreads the bone dust over the surface of the meat which is very unpleasant if in large particles, and if merely in dust form, quickly spoils the meat particularly where it is kept for any length of time.

There have been a number of power driven means developed for accomplishing this purpose which have been more or less unsatisfactory due to bulk, weight and abnormal expense both to manufacture and maintain as well as to the fact that they are not entirely flexible and are oftentimes dangerous.

It is therefore an object of this invention to provide an adjustable cutter having means rendering said cutter operative only when said cutter is actuated.

Another object is to provide a balanced cutting device adjustable with respect to an operating table, which device is compact, inexpensive and durable and one which fulfills all requirements of manufacture and service.

Still another object is to provide an adjustable cutting means which may be associated with tables of any height and one which is readily moved to and held in a position whereby it will not interfere with other operations on said tables.

A further object is to provide a cutting device which is compact, occupies little space, is controlled by a single operator, one which may be easily and quickly associated with any operating table, and may be readily moved to any part of the associated table to perform its work.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a front elevation of a table having one form of the device mounted thereon;

Figure 2 is a fragmentary plan of the table and device shown in Figure 1;

Figure 3 is a fragmentary side elevation of the table and device shown in Figure 1;

Figure 4 is an enlarged sectional elevation of the tightening pawl controlling means, the same being taken substantially in the plane as indicated by the line 4—4 of Figure 2;

Figure 5 is a fragmentary sectional elevation similar to Figure 4, showing a modification of the pawl controlling device;

Figure 6 is an enlarged sectional elevation taken substantially in the plane represented by the line 6—6 of Figure 2, showing the crank and associated shaft for controlling the operation of the saw guard; and Figure 7 is a fragmentary elevation of an adjustable track support for adapting the saw unit to use on any table.

Figure 8 is an enlarged sectional elevation taken through the adjusting rollers of the support for the cutting device.

Figure 9 is an enlarged sectional elevation of the stop for the cutting device bracket, the same being taken substantially in the plane as indicated by the line 9—9 of Figure 2.

Referring now more particularly to Figures 1 to 6 inclusive, 10 represents an operating table such as commonly found in butcher shops, the table including a flat top 11 supported by suitable legs 12. Brackets 13 are disposed at either end of said table and are secured to the under side thereof as by bolts or nails 14. The brackets are provided with supporting means, such as sockets 15, for the purpose of supporting a track member 16 disposed therebetween and which may be tubular in section to conform to the sockets. This member may be supported such as at its midpoint by a bracket 17 fastened as at 18 to a portion of the track, said bracket being fastened to the under side of the table by means 19 similar to the means 14 securing the brackets 13 to said table. If desired, cushioning means (not shown) may be applied to the track adjacent the end brackets providing resilient stops for the bracket support 21.

A track 20 may also be provided on the under side of the table top, said track being preferably substantially U-shaped in section and opening downwardly. Cooperating with tracks 16 and 20, is the bracket support 21 having an enlarged base portion 22 provided with suitably bearinged rollers 23 and 24 adapted to engage both lower and upper sides of the track 16, and it may be desirable to provide one set of rollers, preferably the rollers 23, with an eccentric mounting as shown in Figure 8 so that a simple adjustment of said rollers and consequently the bracket support 21 with respect to the track 16 may be effected. Referring more particularly to Fig. 8, each roller 23 is shown as mounted on an eccentric bushing 123 carried by the nut and bolt connector 25, said bushing being provided with means such as apertures 223 for receiving an adjustment tool for moving said bushing. Inwardly projecting brackets or lugs 26 are provided on the upper part of the base 22 for the purpose of receiving an adjustable shaft 27 of a ball or roller bearing 28 engaging and cooperating with the track 20.

The upper end of the bracket 21 terminates in a bifurcated head 29 provided with a stop 92 adapted for engagement with an extension 91 of the lug 90 carried by the bracket 31, said head being suitably apertured to accommodate a shaft 30 carried thereby. The shaft 30 carries and forms a support for a bracket member 31, the head 32 of which cooperates with the shaft 30 and terminates in sockets 33 adapted to have supporting relation with track members 34 of any suitable shape as tubular. One of the socket members 33 is provided with upstanding arms or lugs 35 to which is pivoted a pawl 36 which may be provided with a stop 37 adapted to engage a portion of the socket to limit the upward disengaging position of the pawl with the ratchet wheel 38 keyed to shaft 30. Toward the ends of the shaft 30 and on the outside of the head portions 32, metal washers 39 may be keyed to shaft 30 as at 40, and adapted to be engaged by portions of hand wheels 41 threaded on the ends of the shaft 30 to provide tightening means between the bracket 31 and its associated mechanism.

A coiled spring 42 is provided between portions of the head 29 of the bracket 21, one end of said spring being keyed or fixed to the shaft 30 as at 43 and the other end being attached preferably to the bottom of the bracket 31 as at 44. The bracket 31 is also provided with a downwardly extending lug or projection 45 provided with an adjusting screw 46, the end of which is adapted to have engagement with a portion of the bracket 21 to adjust the downward position of the bracket 31 and its associated parts. The bracket 21 is provided with an upstanding lug 146 having a pawl 47 pivoted thereto and adapted to have engagement with the ratchet 38, said pawl being provided with a projection 48 for operation thereof.

The pawl 36 may be controlled in any convenient manner as shown in Figures 4 and 5. Referring more particularly to Figure 4, a thumb screw 49 may be provided having threaded engagement with a portion 50 of one of the upstanding lugs or shoulders 35 provided on the bracket 31. Spaced longitudinally of the pawl from its pivot 51, the threaded portion of the thumb screw 49 may be provided with a cam 52 separate from the thumb screw 49, being freely pivoted thereto by the pin 53, it being understood that the cam then engages the pawl 36 so that when the thumb screw is operated inwardly toward the pawl, said pawl will ride up the cam thus releasing the pawl from engagement with the ratchet wheel 38, a reverse movement of the thumb screw serving to move the pawl toward the ratchet wheel.

This structure may be modified as shown in Figure 5 by providing an aperture 54 in the pawl 36 removed longitudinally from the pivot 51 and faced in such a direction as to have engagement with a pointed or cammed end 55 of a thumb screw 56 having a portion 57 having threaded engagement with one of the upstanding lugs of the bracket 31. The cammed end may take the form of a cone eccentric with respect to the aperture 54 so that inward movement of the screw will serve to raise the pawl, as in the embodiment described above.

The track members 34 project toward the opposite edge of the table 10 and terminate in and are attached to a handhold 58, forming a rigid structure with said tracks and preferably apertured to take a switch operating plunger 59 operated at one side of the handhold by a button 60. The opposite end of the plunger serves to operate any convenient form of normally open switch 61 which may be of the spring or snap or any other form. It will readily be seen that the form of track and handhold lends itself readily to provide conduits for any wiring scheme which may be chosen, Supported from the tracks 34, there is a carriage member 62 provided with upper and lower preferably bearinged rollers 63 and 64 having cooperative engagement with the track 34 and being arranged so that preferably the upper rollers are adjustable such as by forming such rollers with eccentric shafts 65 or by utilizing eccentric bushings as already described with respect to the rollers 23. The carriage serves to support a motor 66 directly connected as through a shaft 67 with a saw member or cutter 68 conveniently placed for operation. The saw is provided with an upper guard member 69 secured to a bracket 70 on the carriage 62, said bracket being provided with a handhold 71 adjacent a locking member 72 pivoted as at 73 to the bracket 70. This locking member comprises a hand operating arm 74 normally held in raised position by a spring member 75 disposed between the bracket 70 and the arm 74. The lock 72 may conveniently be in the form of a bell-crank, the other arm 76 of which is provided with teeth 176 adapted to mesh with the teeth of the rack 77 provided along one of the arms 34. A shaft 78 is also provided along this arm adjacent and preferably beneath the rack 77, said shaft being supported in suitable bearings 79 provided on the track member 34. This shaft is provided at its end with a crank 80 having engagement with the switch operating member 59, as in the slot 81. Shaft 78 is provided with a keyway 82 adapted to accommodate a projection 83 of an arm 84 associated with the carriage and slidingly supported on said shaft. Arm 84 is pivoted at 85 to one end of a turnbuckle link or member 86, the opposite end of said member being pivoted to a lug 87 formed on a lower saw guard member 88, said member being pivoted at 89 to the upper guard member 69 to completely encircle the saw 68, a spring 93 being provided between guard members tending to urge the movable member to saw protecting position.

Referring now particularly to the support shown in Figure 7, conditions may arise whereby it is not desired to secure the unit directly to a table, as for instance where it is desired to use said unit in conjunction with various tables. In such a case, the device shown in Figure 7 may be conveniently used. Said device consists essentially of standards 100 supportedly fixed to foot or base members 101 as at 102, said members being provided with securing means 103 for fastening said members to a table, floor or any other support. Brackets 104 are conveniently secured in a proper position on each standard 100 and are provided with a lug 105 having a threaded supporting and adjusting member 106 threaded thereto and extending upwardly for supporting engagement with seat 107 provided on a bearing member 108 encircling each standard. The member 108 on each standard is provided with a lower socket 109 to which is secured the track member 110 of any convenient shape, such as round. The member 108 is provided at its upper end with a supporting lug 111 adapted to have U-shaped member 112, corresponding to the U-shaped member 20, fixed thereto as by means of the bolts 113.

The standards may be provided with upper caps, said caps forming stops 114 limiting the upward movement of the track assembly. Further, members 108 may each be provided with a wedging member such as a cam 115 supported between lugs 116 provided on said bearing. It will readily be appreciated then that there is really formed a structure similar to the track assembly 16 and 20 above described, and as such assembly may be conveniently spaced, the bracket assembly 21 may readily be used with this latter structure as well as with the structure already described in detail so that the parts of one structure are readily interchangeable with those of the other.

In the operation of the unit, ordinarily the spring 42 will be tensioned to balance the weight of the motor and track unit. This may be done by engaging the pawl 36 with the ratchet 38 and raising the track and motor assembly several times, the pawl 47 forming a locking means preventing unwinding of the spring when the unit is being lowered, at which time it will be understood that the pawl 36 will merely drag over the teeth of the rachet. When, then, it is desired to use the cutter, it may be slid to the place desired, it being unnecessary to move the object to be operated upon, and the unit and track may be lowered and adjusted in its lowered position by means of the stop members 45—46, and at ths point it may be well to note that the friction between the hand wheels 41 and the washers 39 keyed to the shaft 30 also aids in preventing the unit from unauthorizedly dropping toward the table, the lug 90 provided on the bracket 31 and provided with the extension 91, overlapping one of the members 29, being engaged with a stop portion 92 provided on said member 29 for the purpose of limiting the upward movement of the unit and track. By moving the arm 74 downward to disengage the locking member 76 with the rack 77, the motor unit may be slid to any place along the track 34, and to set the motor in operation, it is only necessary for the operator to depress the button 60, starting the motor. Depressing the button 60 causes rotation in a counterclockwise direction of the shaft 78, raising the arm 84, in turn causing the lower guard member 88 to release, clearing the saw to draw said member to a position as shown in dotted lines in Figure 1, and it will be understood that due to the sliding engagement between the arm 84 and the shaft 78, there is ready operation of the carriage 62 with the track 34. When the button is released, the current is cut off from the motor and due to the weight of the lower guard member or any spring means which may be provided as at 93 between the upper and lower guard members, the lower guard member immediately assumes a position to protect the saw. The motor may or may not be provided with a magnetic brake as desired, as it is probably sufficient that the guard member assumes its operative position immediately the current is cut off in order to protect the operator or third parties from the spinning cutter.

I do not wish to be limited by the exact embodiments of the device shown as it will be understood that other and various forms of the device will of course be apparent to those skilled in the art.

I claim:

1. In a cutting device, the combination of a support, a member movable along said support, a cutting member associated with said member, said cutting member having a guard mounted on said member and normally disposed to render the cutting edge of said cutting member ineffective, and means associated with said guard operable from said support to move said guard to thereby render the cutting edge of said cutting member effective.

2. In a cutting device, the combination of a cutting member, a support disposed adjacent thereto, a guard movable along said support normally disposed to render the cutting edge of said member ineffective, and means for moving said guard transversely of the plane of said cutting member to thereby render the cutting edge of said member effective.

3. In a cutting device, the combination of a support, a member movable along said support, a cutting member associated with said member, said cutting member having a guard mounted on said member and normally disposed to render the cutting edge of said cutting member ineffective, and means associated with said guard operable from said support to move said guard transversely of the plane of said cutting member to thereby render the cutting edge of said cutting member effective.

4. In a cutting device, the combination of a support, a support carried thereby, a cutter movable in a translational direction with said second named support and having means to rotate the same, and a guard normally positioned to protect the cutter, and means on the second named support for controlling the rotation of said cutter, said means being operative to render said guard inoperative to thereby render said cutter operative.

5. In a device of the character described, the combination of a support, a bracket slidably supported thereby, a cutting device carried by said bracket and having a cutting member, a guard for said cutting member, said guard including a portion movable to a position whereby said cutting member may be effective, means for operating said portion of the guard, and means on said support for operating said cutting device and said last named means.

6. In a device of the character described, the combination of a support, a bracket slidably supported thereby, a cutting device carried by said bracket and having a cutting member, a guard for said cutting member, said guard including a portion movable to a position whereby said cutting member may be effective, means for operating said portion of the guard, said means including a rotatable member on said support and a member slidable on said rotatable member, and means on said support for operating said cutting device and said rotatable member.

Signed at Chicago, Illinois, this 16th day of September, 1927.

WILLIAM J. DRUCKER.